United States Patent
Li et al.

(10) Patent No.: US 9,380,107 B2
(45) Date of Patent: Jun. 28, 2016

(54) MIGRATION EVENT SCHEDULING MANAGEMENT

(71) Applicants: Wen-Syan Li, Fremont, CA (US); Yu Cheng, Shanghai (CN); Mengjiao Wang, Shanghai (CN)

(72) Inventors: Wen-Syan Li, Fremont, CA (US); Yu Cheng, Shanghai (CN); Mengjiao Wang, Shanghai (CN)

(73) Assignee: SAP SE, Walldorf (DE)

(*) Notice: Subject to any disclaimer, the term of this patent is extended or adjusted under 35 U.S.C. 154(b) by 274 days.

(21) Appl. No.: 14/046,470

(22) Filed: Oct. 4, 2013

(65) Prior Publication Data

US 2015/0081911 A1   Mar. 19, 2015

(30) Foreign Application Priority Data

Sep. 18, 2013 (CN) .......................... 2013 1 0429058

(51) Int. Cl.
| | |
|---|---|
| *H04L 12/911* | (2013.01) |
| *H04L 29/08* | (2006.01) |
| *G06F 9/50* | (2006.01) |
| *G06N 3/12* | (2006.01) |

(52) U.S. Cl.
CPC .......... *H04L 67/1002* (2013.01); *G06F 9/5083* (2013.01); *G06N 3/126* (2013.01)

(58) Field of Classification Search
CPC . H04L 41/08; H04L 67/1002; H04L 67/1006; H04L 67/1008; H04L 67/1024; G06F 9/5027; G06F 9/505
See application file for complete search history.

(56) References Cited

U.S. PATENT DOCUMENTS

| | | | | |
|---|---|---|---|---|
| 8,554,918 B1* | 10/2013 | Douglis | .............. | G06F 11/3485 707/640 |
| 2008/0104608 A1* | 5/2008 | Hyser | .................... | G06F 9/5027 718/105 |
| 2008/0209043 A1* | 8/2008 | Ajiro | ...................... | H04L 29/06 709/226 |
| 2010/0325281 A1* | 12/2010 | Li | ..................... | G06F 17/30575 709/226 |
| 2013/0346572 A1* | 12/2013 | Jain | ....................... | G06F 9/5088 709/223 |
| 2014/0059232 A1* | 2/2014 | Plattner | ............... | H04L 67/1029 709/226 |

* cited by examiner

*Primary Examiner* — Nicholas Taylor
*Assistant Examiner* — Afroza Sultana
(74) *Attorney, Agent, or Firm* — Brake Hughes Bellermann LLP

(57) ABSTRACT

In accordance with aspects of the disclosure, systems and methods are provided for scheduling migration events for server resources in a server cluster relative to a time interval while considering load balance constraints and data transfer constraints of the server cluster. The systems and methods may include generating one or more potential migration scheduling schemes for migration of each server resource to at least one other server resource in the server cluster within the time interval while considering the load balance constraints and the data transfer constraints of the server cluster, and generating a migration event schedule for each migration event within the time interval based on the one or more potential migration scheduling schemes generated for migration of each server resource to at least one other server resource in the server cluster.

19 Claims, 11 Drawing Sheets

MIGRATION EVENT SCHEDULING MANAGEMENT

CROSS-REFERENCE TO RELATED APPLICATION

This application claims priority under 35 U.S.C. §119 to Chinese Patent Application 201310429058.3, filed Sep. 18, 2013, titled "MIGRATION EVENT SCHEDULING MANAGEMENT", which is incorporated herein by reference in its entirety.

TECHNICAL FIELD

The present description relates to various computer-based techniques for migration event scheduling management.

BACKGROUND

In typical server network environments, each server may provide multiple resources to be used by tenant users. As many servers may use different but possibly shared resources and provide different levels of access to tenant users, balancing server load and transferring data associated with tenants can be a complex process. For instance, a group of tenants may have access to a group of servers where arbitrary assignment of tenant/server relationships may lead to load imbalance of the servers, which can be detrimental to network/server performance. In typical server network environments, a conventional solution to this problem can be to exhaustively enumerate all combinations of tenants and servers to find a global solution. However, such kind of enumeration can result in a highly complex or relatively unsolvable problem, which can be ineffective. As such, there exists a need to optimize processes associated with tenant placement in server network environments.

SUMMARY

In accordance with aspects of the disclosure, a computer system may be provided for migration event scheduling management including instructions stored on a non-transitory computer-readable medium and executable by at least one processor. The computer system may include a tenant replacement manager configured to cause the at least one processor to schedule migration events for each of a plurality of server resources in a server cluster relative to a time interval while considering load balance constraints and data transfer constraints of the server cluster. The tenant replacement manager may include a load balance handler configured to determine the load balance constraints of the server cluster, and a data transfer handler configured to determine the data transfer constraints of the server cluster. The tenant replacement manager may include a migration event coordinator configured to generate one or more potential migration scheduling schemes for migration of each server resource to at least one other server resource in the server cluster within the time interval while considering the load balance constraints and the data transfer constraints of the server cluster. The tenant replacement manager may include a migration event scheduling optimizer configured to generate a migration event schedule for each migration event within the time interval based on the one or more potential migration scheduling schemes generated for migration of each server resource to at least one other server resource in the server cluster.

In some implementations, the plurality of server resources may include a set of servers, and the server cluster may include the set of servers connected by a network to a set of tenants. Each server resource of the server cluster may be accessible to one or more tenants requesting access to the plurality of server resources of the server cluster including access to computing resources and access to storage resources. The load balance constraints of the server cluster may be defined as a variance of load demand of the server resources in the server cluster, where the variance of load demand may be expressed as: $\mathcal{L} = \Sigma_{i=1}^{|S|}[L_i - \mu]^2$, where $L_i$ is a load of the server resources $s_i$ and $\mu$ is an average load of the server resources. The data transfer constraints of the server cluster may be defined as a sum of storage demand of the server resources in the server cluster based on one or more tenants migrating from one server resource to another server resource, where the sum of storage demand may be expressed as: $\mathcal{D} = \Sigma_j^{|T|} f_j \times D_j$, where $D_j$ is a disk space demanded by a tenant $t_j$, and $f_j$ equals to 1 when $t_j$ is migrated, otherwise $f_j$ equals to zero. The load balance constraints and the data transfer constraints may be normalized and summed in a fitness function with a weighting parameter, where the fitness function may be expressed as: Fitness=$\alpha \mathcal{L} + (1-\alpha) \mathcal{D}$, where $\alpha$ is the weighting parameter.

In some implementations, the migration event coordinator may be configured to receive each load balance constraint and each data transfer constraint as an input for modeling as a chromosome by the migration event coordinator, and the migration event coordinator may be configured to generate the one or more potential migration scheduling schemes based on each load balance constraint and each data transfer constraint that is modeled as the chromosome.

In some implementations, the migration event coordinator may comprise a genetic algorithm handler including a chromosome comparator configured to compare a plurality of migration scheduling chromosomes, where each migration scheduling chromosome including the one or more potential migration scheduling schemes for migration of each server resource to at least one other server resource in the server cluster within the time interval while considering the load balance constraints and the data transfer constraints of the server cluster, and configured to compare each of the plurality of migration scheduling chromosomes relative to the load balance constraints and the data transfer constraints, to thereby output a selected subset of the plurality of migration scheduling chromosomes. The genetic algorithm handler may include a chromosome combiner configured to combine migration scheduling chromosomes of the selected subset of the plurality of migration scheduling chromosomes to obtain a next generation of migration scheduling chromosomes for output to the chromosome comparator and for subsequent comparison therewith of the next generation of migration scheduling chromosomes with respect to the load balance constraints and the data transfer constraints, as part of an evolutionary loop of the plurality of migration scheduling chromosomes between the chromosome comparator and the chromosome combiner. The migration event scheduling optimizer may be configured to monitor the evolutionary loop and select a selected migration scheduling chromosome therefrom for implementation of the migration event schedule based thereon.

In some implementations, the chromosome combiner may be configured to combine the migration scheduling chromosomes including selecting pairs of migration scheduling chromosomes and crossing over portions of each pair of migration scheduling chromosomes to obtain a child chromosome of the next generation. At least a portion of the evolutionary loop may be executed using parallel processes in which each generation of migration scheduling chromosomes is divided into sub-groups for parallel processing thereof. The migration event scheduling optimizer may be configured to select the selected migration scheduling chromosome after a predetermined number of generations of the evolutionary loop, or after determining that the selected migration scheduling chromosome satisfies the load balance constraints and the data transfer constraints to a predetermined extent.

In accordance with aspects of the disclosure, a computer program product may be provided for migration event scheduling management. The computer program product may be tangibly embodied on a non-transitory computer-readable storage medium and may include instructions that, when executed by at least one processor, are configured to schedule migration events for each of a plurality of server resources in a server cluster relative to a time interval while considering load balance constraints and data transfer constraints of the server cluster. The instructions, when executed by the at least one processor, may be configured to determine the load balance constraints of the server cluster, determine the data transfer constraints of the server cluster, and generate one or more potential migration scheduling schemes for migration of each server resource to at least one other server resource in the server cluster within the time interval while considering the load balance constraints and the data transfer constraints of the server cluster. The instructions, when executed by the at least one processor, may be configured to generate a migration event schedule for each migration event within the time interval based on the one or more potential migration scheduling schemes generated for migration of each server resource to at least one other server resource in the server cluster.

In some implementations, the load balance constraints of the server cluster may be defined as a variance of load demand of the server resources in the server cluster, where the variance of load demand may be expressed as: $\mathcal{L} = \Sigma_{i=1}^{|S|}[L_i - \mu]^2$, where $L_i$ is a load of the server resources $s_i$ and $\mu$ is an average load of the server resources. The data transfer constraints of the server cluster may be defined as a sum of storage demand of the server resources in the server cluster based on one or more tenants migrating from one server resource to another server resource, where the sum of storage demand may be expressed as: $\mathcal{D} = \Sigma_j^{|T|} f_j \times D_j$, where $D_j$ is a disk space demanded by a tenant $t_j$, and $f_j$ equals to 1 when $t_j$ is migrated, otherwise $f_j$ equals to zero. The load balance constraints and the data transfer constraints may be normalized and summed in a fitness function with a weighting parameter, where the fitness function may be expressed as: Fitness=$\alpha \mathcal{L} + (1-\alpha)\mathcal{D}$, where $\alpha$ is the weighting parameter.

In some implementations, the instructions when executed by the processor may be configured to compare a plurality of migration scheduling chromosomes with each migration scheduling chromosome including the one or more potential migration scheduling schemes for migration of each server resource to at least one other server resource in the server cluster within the time interval while considering the load balance constraints and the data transfer constraints of the server cluster. The instructions when executed by the processor may be configured to compare each of the plurality of migration scheduling chromosomes relative to the load balance constraints and the data transfer constraints, to thereby output a selected subset of the plurality of migration scheduling chromosomes. The instructions when executed by the processor may be configured to combine migration scheduling chromosomes of the selected subset of the plurality of migration scheduling chromosomes to obtain a next generation of migration scheduling chromosomes for output and for subsequent comparison therewith of the next generation of migration scheduling chromosomes with respect to the load balance constraints and the data transfer constraints, as part of an evolutionary loop of the plurality of migration scheduling chromosomes. The instructions when executed by the processor may be configured to monitor the evolutionary loop and select a selected migration scheduling chromosome therefrom for implementation of the migration event schedule based thereon.

In some implementations, the instructions when executed by the processor may be configured to combine the migration scheduling chromosomes including selecting pairs of migration scheduling chromosomes and crossing over portions of each pair of migration scheduling chromosomes to obtain a child chromosome of the next generation, execute at least a portion of the evolutionary loop using parallel processes in which each generation of migration scheduling chromosomes is divided into sub-groups for parallel processing thereof, and select the selected migration scheduling chromosome after a predetermined number of generations of the evolutionary loop, or after determining that the selected migration scheduling chromosome satisfies the load balance constraints and the data transfer constraints to a predetermined extent.

In accordance with aspects of the disclosure, a computer-implemented method may be provided for migration event scheduling management. The method may include scheduling migration events for each of a plurality of server resources in a server cluster relative to a time interval while considering load balance constraints and data transfer constraints of the server cluster. The method may include determining the load balance constraints of the server cluster, determining the data transfer constraints of the server cluster, and generating one or more potential migration scheduling schemes for migration of each server resource to at least one other server resource in the server cluster within the time interval while considering the load balance constraints and the data transfer constraints of the server cluster. The method may include generating a migration event schedule for each migration event within the time interval based on the one or more potential migration scheduling schemes generated for migration of each server resource to at least one other server resource in the server cluster.

In some implementations, the method may include comparing a plurality of migration scheduling chromosomes with each migration scheduling chromosome including the one or more potential migration scheduling schemes for migration of each server resource to at least one other server resource in the server cluster within the time interval while considering the load balance constraints and the data transfer constraints of the server cluster. The method may include comparing each of the plurality of migration scheduling chromosomes relative to the load balance constraints and the data transfer constraints, to thereby output a selected subset of the plurality of migration scheduling chromosomes. The method may include combining migration scheduling chromosomes of the selected subset of the plurality of migration scheduling chromosomes to obtain a next generation of migration scheduling chromosomes for output to the chromosome comparator and for subsequent comparison therewith of the next generation of migration scheduling chromosomes with respect to the load balance constraints and the data transfer constraints, as part of an evolutionary loop of the plurality of migration scheduling chromosomes. The method may include monitoring the evolutionary loop and select a selected migration scheduling chromosome therefrom for implementation of the migration event schedule based thereon.

In some implementations, the method may include combining the migration scheduling chromosomes including selecting pairs of migration scheduling chromosomes and crossing over portions of each pair of migration scheduling chromosomes to obtain a child chromosome of the next generation. The method may include executing at least a portion of the evolutionary loop using parallel processes in which each generation of migration scheduling chromosomes is divided into sub-groups for parallel processing thereof. The method may include selecting the selected migration scheduling chromosome after a predetermined number of generations of the evolutionary loop, or after determining that the selected migration scheduling chromosome satisfies the load balance constraints and the data transfer constraints to a predetermined extent.

In some implementations, the load balance constraints of the server cluster may be defined as a variance of load demand of the server resources in the server cluster, where the variance of load demand may be expressed as: $\mathcal{L} = \Sigma_{i=1}^{|S|} [L_i - \mu]^2$, where $L_i$ is a load of the server resources $s_i$ and $\mu$ is an average load of the server resources. The data transfer constraints of the server cluster may be defined as a sum of storage demand of the server resources in the server cluster based on one or more tenants migrating from one server resource to another server resource, where the sum of storage demand may be expressed as: $\mathcal{D} = \Sigma_j^{|T|} f_j \times D_j$, where $D_j$ is a disk space demanded by a tenant $t_j$, and $f_j$ equals to 1 when $t_j$ is migrated, otherwise $f_j$ equals to zero. The load balance constraints and the data transfer constraints may be normalized and summed in a fitness function with a weighting parameter, where the fitness function may be expressed as: Fitness=$\alpha \mathcal{L} + (1-\alpha) \mathcal{D}$, where $\alpha$ is the weighting parameter.

The details of one or more implementations are set forth in the accompanying drawings and the description below. Other features will be apparent from the description and drawings, and from the claims.

DETAILED DESCRIPTION

Figure 1A:
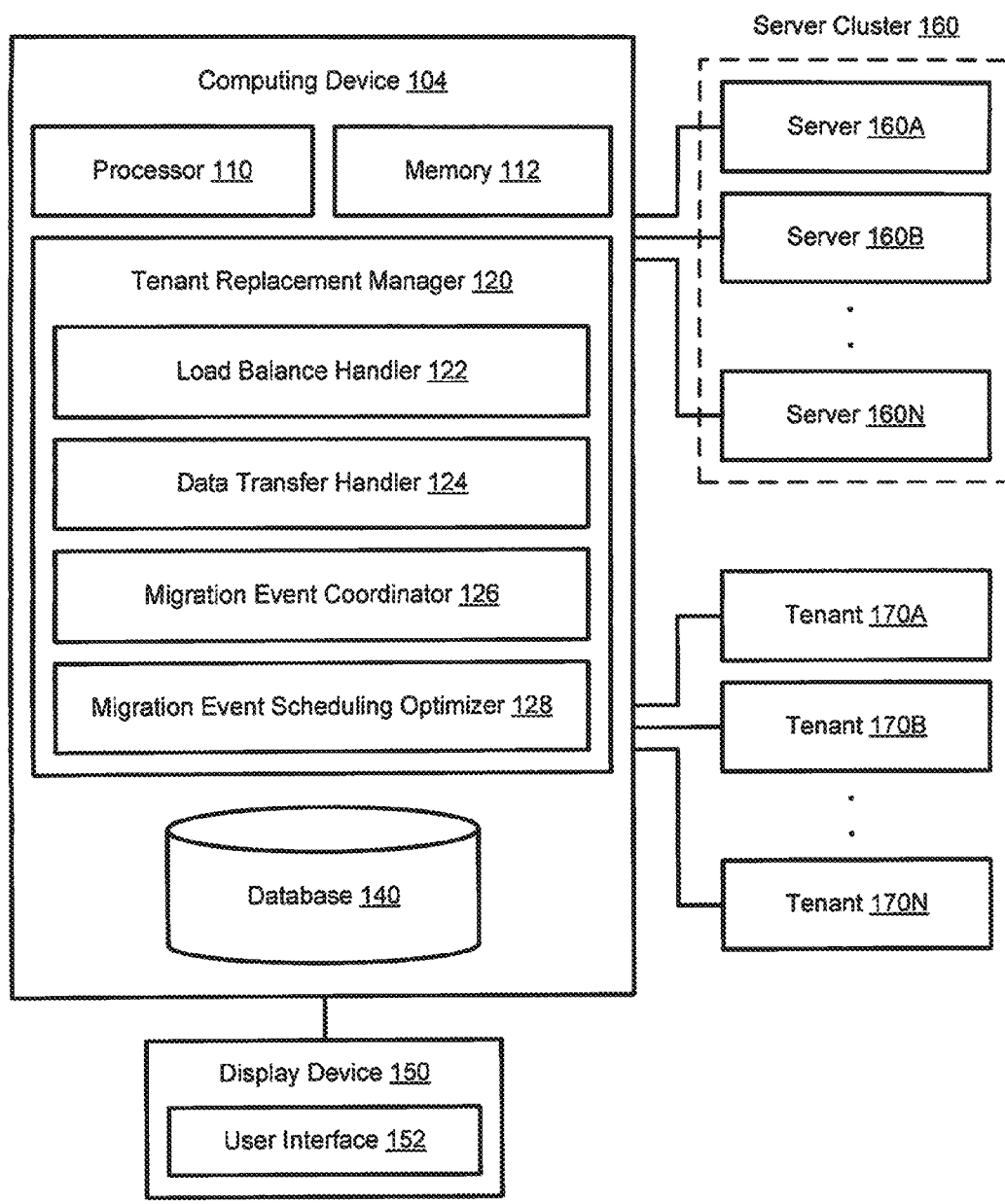
FIGS. 1A-1B are block diagrams illustrating various example systems for migration event scheduling management, in accordance with aspects of the disclosure.
Figure 1B:
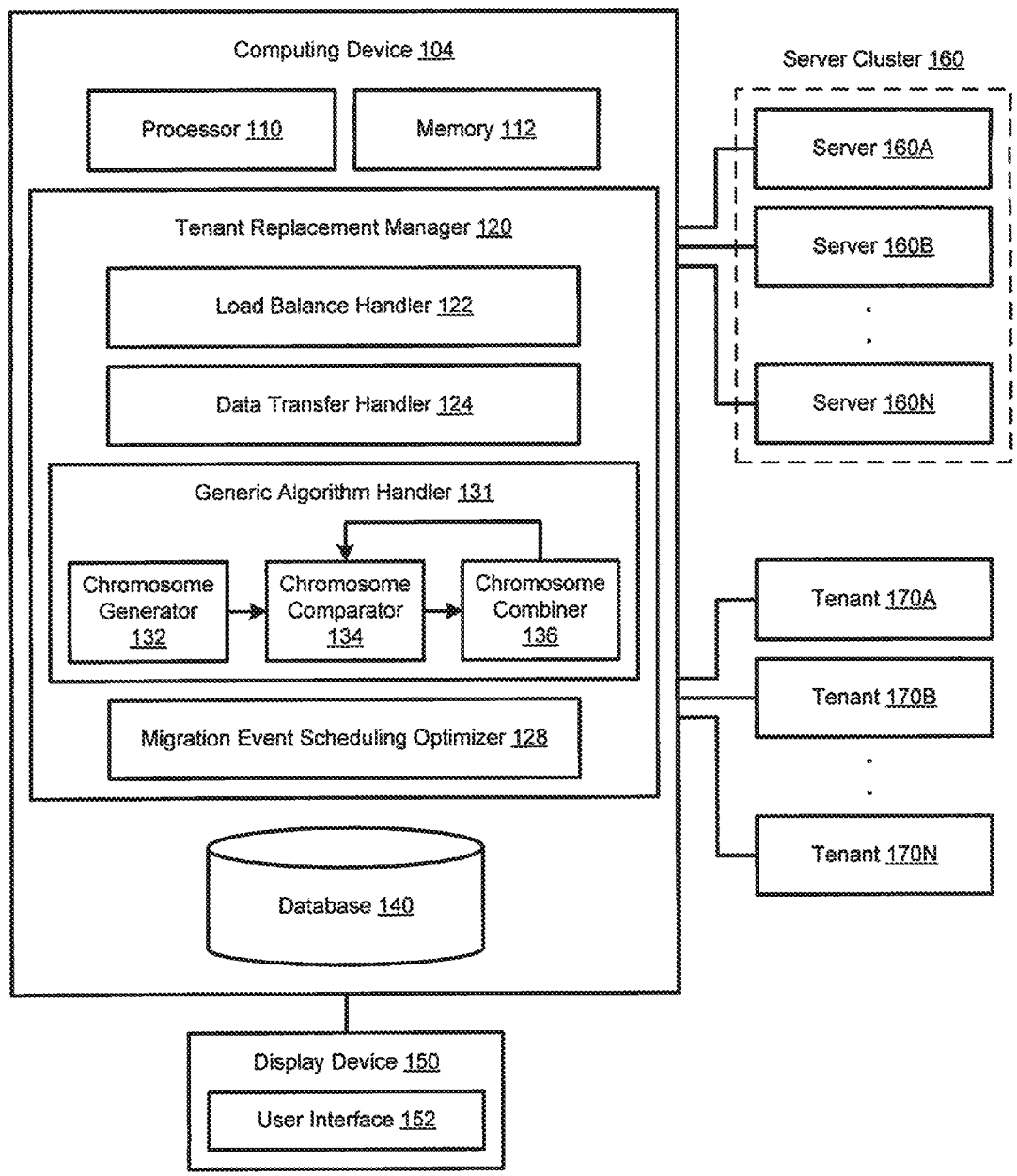

FIGS. 1A-1B are block diagrams illustrating various example systems for migration event scheduling management, in accordance with aspects of the disclosure.

In particular, FIG. 1A is a block diagram illustrating an example system 100 for migration event scheduling management by implementing a tenant replacement manager 120, a migration event coordinator 126, and a migration event scheduling optimizer 128 to manage, coordinate, and optimize migration event scheduling, in accordance with aspects of the disclosure. In some implementations, migration event scheduling may include tenant placement/movement in a server cluster (or server farm) for load balance and minimum data movement/migration.

In the example of FIG. 1A, the system 100 comprises a computer system for implementing a migration event scheduling management system that may be associated with a computing device 104, thereby transforming the computing device 104 into a special purpose machine designed to determine and implement migration scheduling process(es), as described herein. In this sense, it may be appreciated that the computing device 104 may include any standard element(s) and/or component(s), including at least one processor(s) 110, memory (e.g., non-transitory computer-readable storage medium) 112, database(s) 140, power, peripherals, and various other computing elements and/or components that may not be specifically shown in FIG. 1A. Further, the system 100 may be associated with a display device 150 (e.g., a monitor or other display) that may be used to provide a user interface (UI) 152, such as, in some examples, a graphical user interface (GUI). In an implementation, the UI 152 may be used, for example, to receive preferences from a user for managing or utilizing the system 100. As such, it should be appreciated that various other elements and/or components of the system 100 that may be useful to implement the system 100 may be added or included, as would be apparent to one of ordinary skill in the art.

In the example of FIG. 1A, the migration event scheduling management system 100 may include the computing device 104 and instructions recorded/stored on the non-transitory computer-readable medium 112 and executable by the at least one processor 110. Thus, in an implementation, the migration event scheduling management system 100 may include the display device 150 for providing output to a user, and the display device 150 may include the UI 152 for receiving input from the user.

The migration event scheduling management system 100 may include a tenant replacement manager 120 configured to cause the at least one processor 110 to schedule migration events for each of a plurality of server resources 160A, 160B, ..., 160N in a server cluster 160 relative to a time interval while considering load balance constraints and data transfer constraints of the server cluster 160.

In some implementations, the load balance constraints may include load balance objectives, and the data transfer constraints may include data transfer objectives including minimal data transfer objectives. In other implementations, the load balance constraints may include minimum and/or maximum load constraints for each server resource 160A, 160B, ..., 160N in the server cluster 160, and the data transfer constraints may include minimum and/or maximum data constraints for each server resource 160A, 160B, ..., 160N in the server cluster 160.

In some implementations, the plurality of server resources 160A, 160B, ..., 160N may include a set of servers, and the server cluster 160 may include the set of servers connected by a network to a set of tenants 170A, 170B, ..., 170N. Each server resource 160A, 160B, ..., 160N in the server cluster 160 may be accessible to one or more tenants 170A, 170B, ..., 170N of the set of tenants requesting access to the plurality of server resources 160A, 160B, ..., 160N of the server cluster 160 including access to computing resources and access to storage resources.

In some implementations, the server cluster 160 (or server farm) includes multiple server resources 160A, 160B, ..., 160N (or multiple servers) that are connected by a computer network. Each server resource may be accessible to a number of tenants 170A, 170B, . . . , 170N that request access to the server resources 160A, 160B, . . . , 160N in the server cluster 160, such as computation and storage on demand. Sometimes, a load of the server resources may be in balance. However, such a load balance may be interrupted due to some new requirements or requests from one or more of the tenants 170A, 170B, . . . , 170N. For instance, a tenant 170A, 170B, . . . , 170N may request access to more storage than available space of an assigned server resource 160A, 160B, . . . , 160N. Thus, in various implementations, this tenant 170A, 170B, . . . , 170N may be moved/migrated to another one of the server resources 160A, 160B, . . . , 160N that may have available storage/disk space or move/migrate other tenants from the current server resources to one or more other server resources 160A, 160B, . . . , 160N. In the event of a tenant 170A, 170B, . . . , 170N being moved/migrated, the data of this tenant 170A, 170B, . . . , 170N may also be moved/migrated. This type of data migration may be slow when the tenant 170A, 170B, . . . , 170N has a large data storage requirement.

Thus, aspects of the disclose are directed to an optimal tenant replacement system and methods for the server cluster 160 (or server farm) that may be configured to simultaneously minimize data transfer and balance server load. For example, in reference to FIG. 1A, ten servers in a server cluster may be accessible to a group/set of tenants, and an arbitrary tenant replacement may lead to potential server load imbalance. However, in accordance with aspects of the disclosure, load balance may be achieved by means of an optimization system and methods to provide a more efficient server cluster/farm, in a manner as described in greater detail herein.

In some examples, one solution to this problem may be to exhaustively enumerate all combinations of tenants and servers to find a global optimal. However, this type of enumeration may be a NP-complete problem (i.e., nondeterministic polynomial time complete problem), which may be unable to be solved in poly-nominal-time. Thus, aspects of the disclosure provide another solution to this problem, for instance, with an approximation system and methods may be based on a genetic algorithm (GA) adapted or configured to manage tenants for server clusters/farms. In various implementations, this GA system and methods may be configured to replace tenants to servers such that both data migration and load balance may be optimized. Further scope and functionality for this system and methods thereof are described in greater detail herein.

In the example of FIG. 1A, the tenant replacement manager 120 may include a load balance handler 122 configured to determine the load balance constraints of the server cluster 160. In some implementations, the load balance constraints of the server cluster 160 may be defined as a variance of load demand of the server resources 160A, 160B, . . . , 160N in the server cluster 160, which is described further herein.

In the example of FIG. 1A, the tenant replacement manager 120 may include a data transfer handler 124 configured to determine the data transfer constraints of the server cluster 160. In some implementations, the data transfer constraints of the server cluster 160 may be defined as a sum of storage demand of the server resources 160A, 160B, . . . , 160N in the server cluster 160 based on one or more tenants 170A, 170B, . . . , 170N migrating from one server resource to another server resource in the server cluster 160, which is described further herein.

In various implementations, the tenant replacement manager 120 may use various types of data stored in the database 140 related to the load balance constraints and data transfer constraints which may be known or thought to influence, control, and/or otherwise influence migration events. For instance, data related to the server resources 160A, 160B, . . . , 160N in the server cluster 160 may be stored in the database 140, and server resource data may describe a current, historical, and/or maximum load and data storage capacity of each of the server resources 160A, 160B, . . . , 160N. The server resource data may describe load balance constraints and/or data transfer constraints associated with each of the server resources 160A, 160B, . . . , 160N. In another instance, data related to the tenants 170A, 170B, . . . , 170N may be stored in the database 140, and tenant data may describe past, present, and/or any relevant data about the each tenants 170A, 170B, . . . , 170N, such as, for example, load and storage requirements.

In various implementations, the load balance constraints may include load balance objectives including minimum and/or maximum load balance objectives, and the data transfer constraints may include data transfer objectives including minimum and/or maximum data transfer objectives. In other implementations, the load balance constraints may include load constraints for each server resource 160A, 160B, . . . , 160N in the server cluster 160, and the data transfer constraints may include data constraints for each server resource 160A, 160B, . . . , 160N in the server cluster 160.

In various implementations, it should be appreciated that any example data is intended merely as non-limiting examples, and any additional and/or alternative types of data may be used in the operations of the tenant replacement manager 120. For instance, data may be stored, e.g., in one or more databases 140 and/or elsewhere.

In the example of FIG. 1A, the tenant replacement manager 120 may include a migration event coordinator 126 configured to generate one or more potential migration scheduling schemes for migration of each server resource 160A, 160B, . . . , 160N to at least one other server resource 160A, 160B, . . . , 160N in the server cluster 160 within the time interval while considering the load balance constraints (including, in some examples, load balance objectives) of the server cluster 160 and the data transfer constraints (including, in some examples, data transfer objectives) of the server cluster 160. In some implementations, the migration event coordinator 126 may be configured to receive each load balance constraint and each data transfer constraint as an input for modeling as a chromosome by the migration event coordinator 126. In some implementations, the migration event coordinator 126 may be further configured to generate the one or more potential migration scheduling schemes based on each load balance constraint and each data transfer constraint that is modeled as the chromosome.

In the example of FIG. 1A, the tenant replacement manager 120 may include a migration event scheduling optimizer 128 configured to generate a migration event schedule for each migration event within the time interval based on the one or more potential migration scheduling schemes generated for migration of each server resource 160A, 160B, . . . , 160N to at least one other server resource 160A, 160B, . . . , 160N in the server cluster 160.

In some implementations, the tenant replacement manager 120 may use the migration event scheduling optimizer 128 and/or the migration event coordinator 126 to generate a migration event schedule to include a particular migration scheduling scheme and/or solution for use in scheduling an actual usage(s) of one or more of the server resources 160A, 160B, . . . , 160N.

In the example of FIG. 1A, it should be appreciated that the migration event scheduling management system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1A. As such, it should be appreciated that conventional functionality that may be considered useful to the system 100 of FIG. 1A may be included as well even though such conventional elements are not illustrated explicitly, for the sake of clarity and convenience.

In various implementations, a network (or computer network) may be implemented as a single network or a combination of multiple networks. For example, a network may include a wireless telecommunications network (e.g., cellular telephone network) adapted for communication with one or more other communication networks, such as the Internet. In other examples, the network 160 may include the Internet, one or more intranets, landline networks, wireless networks, and/or one or more other types of communication networks. As such, in various examples, the computing device 104, the one or more server resources 160A, 160B, . . . , 160N in the server cluster 160, and the one or more tenants 170A, 170B, . . . , 170N may be associated with a particular link (e.g., a link, such as a URL (Uniform Resource Locator) to an IP (Internet Protocol) address) for communication with each other via the network.

FIG. 1B is a block diagram illustrating another example system 150 for migration event scheduling management by implementing a genetic algorithm to manage migration scheduling, in accordance with aspects of the disclosure. In some examples, migration event scheduling may include tenant placement in a server cluster (or server farm) for load balance and minimum data movement.

In an implementation, the system 150 comprises a computer system for implementing a migration event scheduling management system that may be associated with the computing device 104 of the system 100 of FIG. 1A. As such, to simplify the following discussion, similar components of the system 150 of FIG. 1B may include the same scope and functionality of the system 100 of FIG. 1A, thereby transforming the computing device 104 of FIG. 1B into a special purpose machine designed to determine and implement migration scheduling process(es), as described herein.

In an implementation, the migration event coordinator 126 of the system 100 of FIG. 1A may be configured as a genetic algorithm handler 131. Therefore, in the example of FIG. 1B, the tenant replacement manager 120 of the system 150 may include the genetic algorithm handler 131. In some examples, the genetic algorithm handler 131 may be configured to implement a randomized algorithm approach known as a genetic algorithm (GA), which may refer generally to a computer simulation of Darwinian natural selection that iterates through successive generations to converge toward a best solution in a problem/solution space. Such a genetic algorithm (GA) may be used by the system 150 to consider requirements, parameters, and/or constraints into the migration scheduling optimization process. Further, in some implementations, the migration event scheduling management system 150 may be considered capable of recommending and/or selecting "best-available" migration scheduling schemes, as described herein.

In the system 150, the genetic algorithm approach may be implemented, for example, by creating one or more "chromosomes" representing a possible solution to the problem of generating a migration scheduling scheme. Specific examples of such migration scheduling chromosomes are described herein. However, generally speaking, it should be appreciated that such migration scheduling chromosomes may include one or more potential migration scheduling schemes for each server resource 160A, 160B, . . . , 160N based on the migration events for each server resource 160A, 160B, . . . , 160N.

Further, it should be appreciated that such potential migration scheduling schemes may be used to compare each migration scheduling chromosomes relative to the load capacity and data storage capacity, to thereby output a selected subset of migration scheduling chromosomes. Therefore, there may be a single such migration scheduling chromosome that may represent a single best migration scheduling solution for a given set of migration scheduling objectives to thereby maximize and/or optimize load balance and data transfer. However, optimization of potential migration scheduling schemes (i.e., migration scheduling chromosomes) may be relative to needs of a tenant and various other factors including constraints, parameters, and/or requirements. In some instances, due to the nature of the genetic algorithms used herein, the tenant replacement manager 120 may be configured to find a "best" solution that is close to an optimal solution, even if the actual optimal solution is not identifiable as such.

In some implementations, the migration event scheduling optimizer 128 may be configured for tuning constraints to provide designations between possible objectives of the tenant replacement manager 120, and it should be appreciated that various factors including constraints, parameters, and/or requirements may be considered to be necessary or optional. For instance, in scenarios in which load balance and data transfer should be optimized, a full utilization of the genetic algorithm may be an option but may not be a requirement.

The tenant replacement manager 120 may be configured to utilize the genetic algorithm via the genetic algorithm handler 131 to create, compare, and combine multiple migration scheduling chromosomes in a manner to thereby create a new generation or population of migration scheduling chromosomes for evaluation so that a subset thereof may be selected for reproduction and subsequent evaluation. In this way, each generation and/or population of migration scheduling chromosomes may tend to converge toward an optimal solution for potential migration scheduling schemes. In some examples, the migration event scheduling optimizer 128 may be configured to select a particular migration scheduling solution (i.e., one of the potential migration scheduling schemes or one of the migration scheduling chromosomes) for use in determining or selecting a best potential migration scheduling schemes.

In the example of FIG. 1B, the genetic algorithm handler 131 may include the chromosome generator 132 configured for generating one or more migration scheduling chromosomes. In some instances, such migration scheduling chromosome generation may occur at random or may include some initial constraints, guidelines, or restrictions. The chromosome generator 132 may be configured to generate an initial population or set of migration scheduling chromosomes, which may be evaluated by the chromosome comparator 134 that may be configured for comparing each migration scheduling chromosome including the one or more potential migration scheduling schemes for use of each server resource 160A, 160B, . . . , 160N within one or more time intervals based on the migration events for each server resource 160A, 160B, . . . , 160N in the server cluster 160. The chromosome comparator 134 may be configured to compare each of the plurality of migration scheduling chromosomes relative to one or more time intervals while considering the load balance constraints and the data transfer constraints, to thereby output a selected subset of the plurality of migration scheduling chromosomes, which may represent the best available potential migration scheduling scheme. These and various other related aspects are described in greater detail herein.

The chromosome combiner 136 may be configured to receive the selected subset of the plurality of migration scheduling chromosomes and may be configured to combine (e.g., crossover and mutate) migration scheduling chromosomes of the selected subset of the plurality of migration scheduling chromosomes to obtain a next generation (population) of migration scheduling chromosomes for output to the chromosome comparator 134, which may then perform another, subsequent comparison therewith of the next generation of migration scheduling chromosomes with respect to the load balance constraints and the data transfer constraints, as part of an evolutionary loop of successive generations of the plurality of migration scheduling chromosomes between the chromosome comparator 134 and the chromosome combiner 136. With each successive generation, the new population of migration scheduling chromosomes may represent or include possible improved or near-optimal schedule(s). In some implementations, new generations and/or populations may be iteratively created until either an optimal solution is met, or until factors, preferences, and/or requirements are met up to some pre-defined satisfactory level or threshold, or until a pre-determined number of generations is calculated, or until time runs out to compute new generations/populations (at which point a best solution of the current generation may be selected).

The migration event scheduling optimizer 128 may be configured to monitor the evolutionary loop and to select a selected migration scheduling chromosome therefrom for implementation of the migration scheduling scheme based thereon. As referenced herein, the selected migration scheduling chromosome and/or solution may represent either a best (optimal or near optimal) solution, or may represent a best-available solution. Thus, the migration event scheduling optimizer 128 may be tasked with determining whether, when, and how to interrupt or otherwise end the evolutionary loop and extract a best, best-available, optimal, or near optimal solution. Then, the migration event scheduling optimizer 128 may output a selected migration scheduling chromosome and/or execute an actual migration event schedule.

In the example of FIG. 1B, the chromosome combiner 136 may be further configured to combine the migration scheduling chromosomes including selecting pairs of migration scheduling chromosomes and crossing over portions of each pair of migration scheduling chromosomes to obtain a child chromosome of the next generation. In an implementation, at least a portion of the evolutionary loop may be executed using parallel processes in which each generation of migration scheduling chromosomes is divided into sub-groups for parallel processing thereof. In this instance, the migration event scheduling optimizer 128 may be further configured to select the selected migration scheduling chromosome after a predetermined number of generations of the evolutionary loop, or after determining that the selected migration scheduling chromosome satisfies the constraints to a predetermined extent.

In the example of FIG. 1B, it should be appreciated that the migration event scheduling management system 150 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1B. As such, it should be appreciated that conventional functionality that may be considered useful to the system 150 of FIG. 1B may be included as well even though such conventional elements are not illustrated explicitly, for the sake of clarity and convenience.

Figure 2:
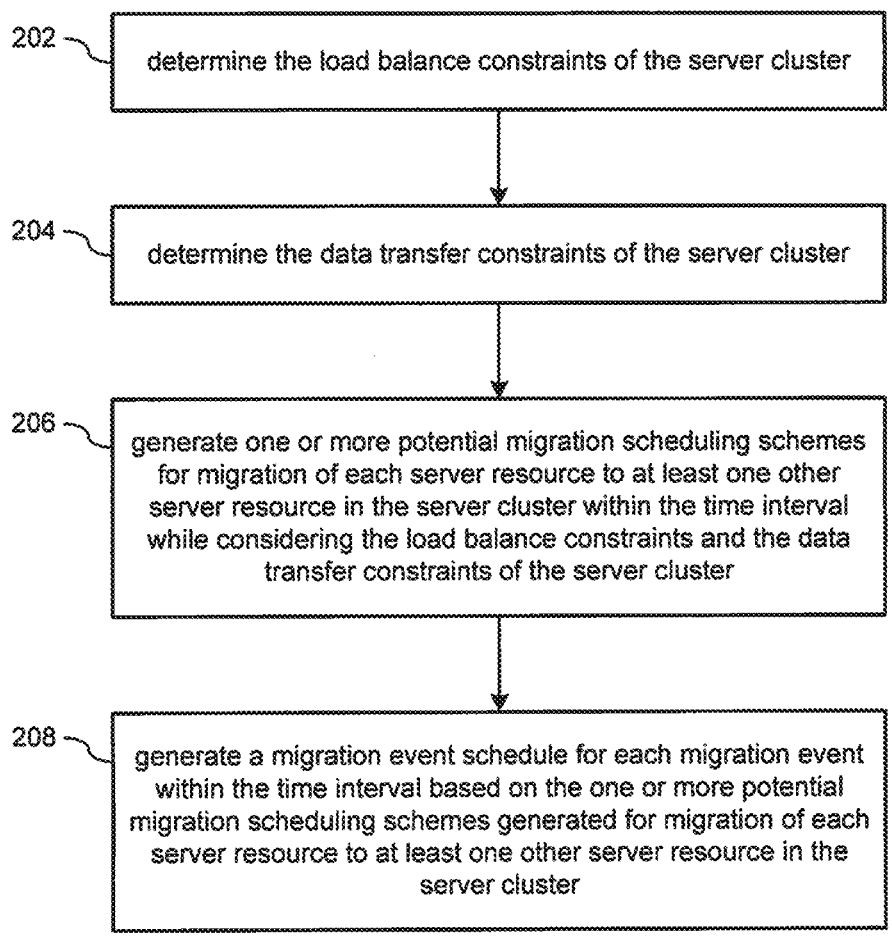
FIG. 2 is a process flow illustrating an example method for managing migration scheduling, in accordance with aspects of the disclosure.

FIG. 2 is a process flow illustrating an example method 200 for managing migration scheduling, in accordance with aspects of the disclosure.

In the example of FIG. 2, operations 202-208 are illustrated as discrete operations occurring in sequential order. However, it should be appreciated that, in other implementations, two or more of the operations 202-208 may occur in a partially or completely overlapping or parallel manner, or in a nested or looped manner, or may occur in a different order than that shown. Further, additional operations, that may not be specifically illustrated in the example of FIG. 2, may also be included in some example implementations, while, in other implementations, one or more of the operations 202-208 may be omitted. Further, in some implementations, the method 200 may include a process flow for a computer-implemented method for managing migration scheduling in the system 100 of FIG. 1A and the system 150 of 1B. Further, as described herein, the operations 202-208 may provide a simplified operational process flow that may be enacted by the computer system 104 to provide features and functionalities as described in reference to FIGS. 1A and 1B.

In an aspect of the disclosure, the method 200 of FIG. 2 may be provided for scheduling migration events for each of a plurality of server resources in a server cluster relative to a time interval while considering load balance constraints and data transfer constraints of the server cluster.

In the example of FIG. 2, at 202, the method 200 may include determining the load balance constraints of the server cluster.

At 204, the method 200 may include determining the data transfer constraints of the server cluster.

At 206, the method 200 may include generating one or more potential migration scheduling schemes for migration of each server resource to at least one other server resource in the server cluster within the time interval while considering the load balance constraints and the data transfer constraints of the server cluster. In some examples, the constraints may include objectives including minimum and/or maximum objectives. In other examples, the load balance constraints may include load constraints and/or load objectives for each server in a server cluster, and the data transfer constraints may include data constraints and/or data objectives for each server in a server cluster.

At 208, the method 200 may include generating a migration event schedule for each migration event within the time interval based on the one or more potential migration scheduling schemes generated for migration of each server resource to at least one other server resource in the server cluster.

Figure 3A:
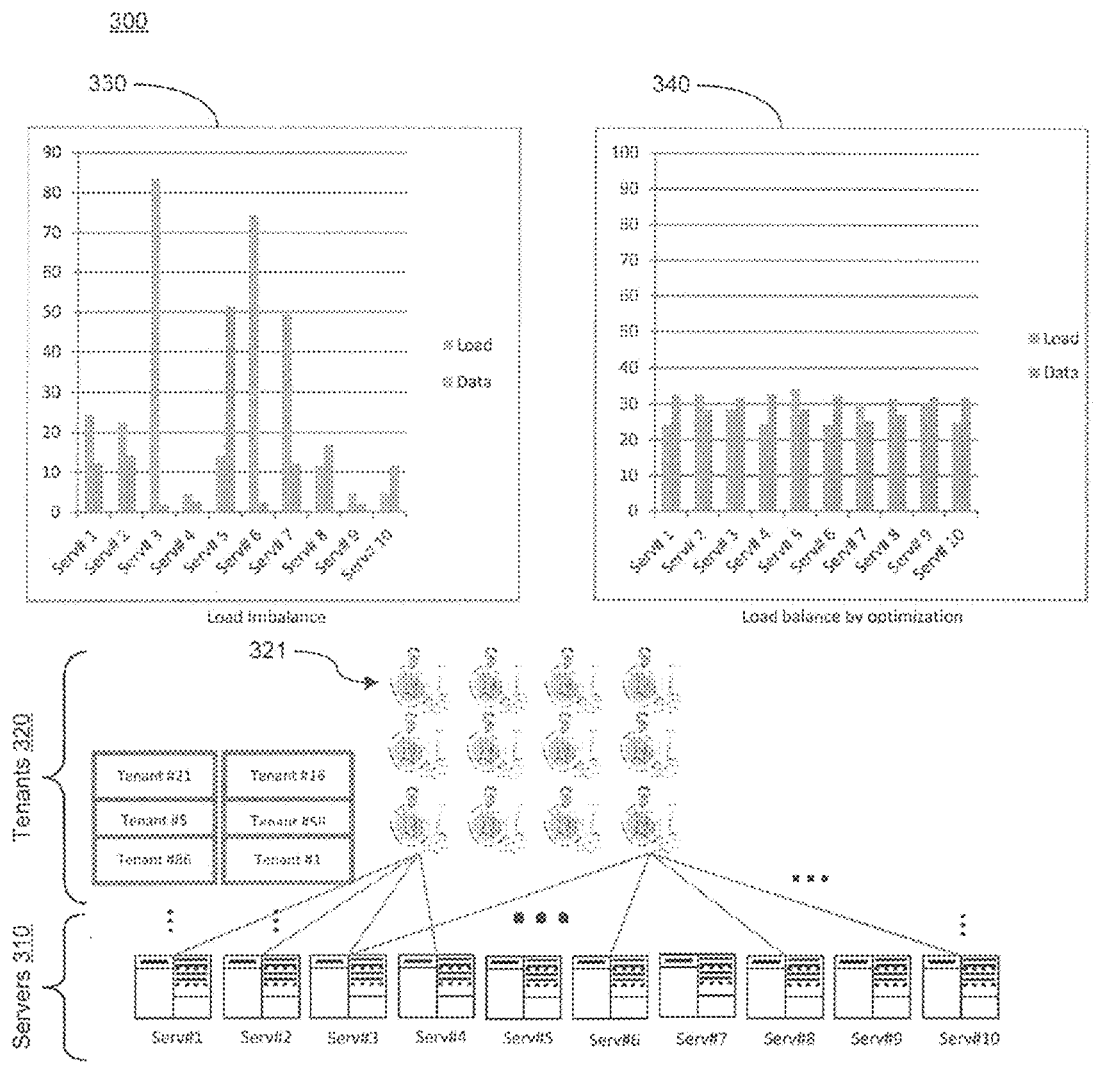
FIGS. 3A-3B are diagrams illustrating example system implementations for managing migration scheduling, in accordance with aspects of the disclosure.
Figure 3B:
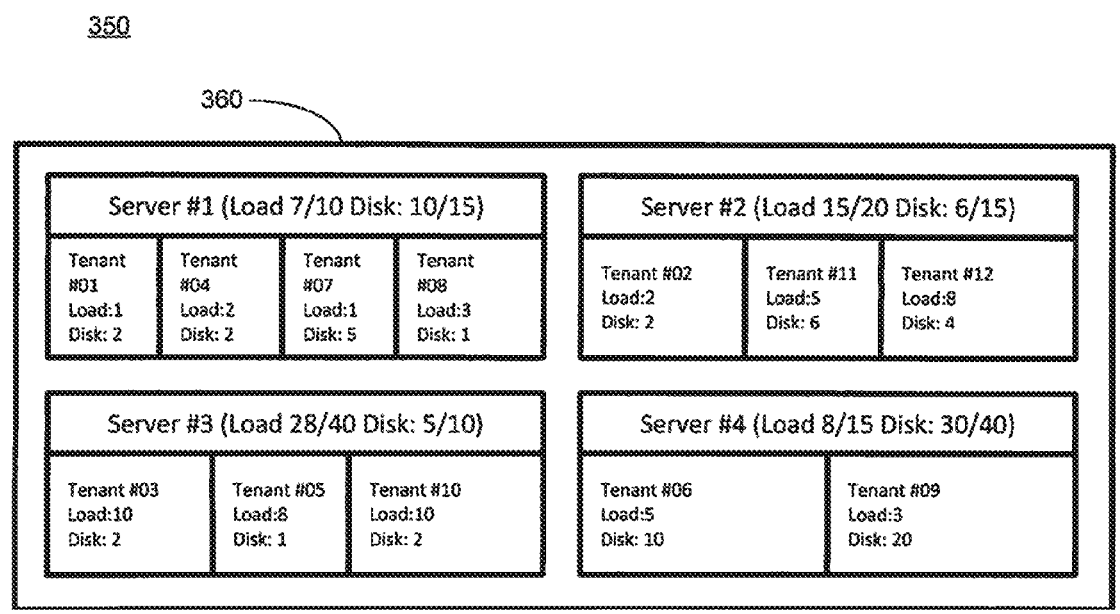

FIGS. 3A-3B are diagrams illustrating example system implementations for managing migration scheduling, in accordance with aspects of the disclosure.

In particular, FIG. 3A is a diagram illustrating an example implementation 300 for managing, coordinating, and optimizing migration scheduling for load balance and data transfer, in accordance with aspects of the disclosure.

For instance, in some implementations, a server cluster/farm 310 may include multiple servers #1-10 that may be connected by a computer network. Each server #1-10 may be accessible to a number of tenants 320 that request or require access to resources of the servers #1-10, such as computation and storage on demand. In some examples, load of the servers #1-10 may be in balance. However, such a load balance may be interrupted due to some new access requests and/or requirements of the tenants 320. In some examples, a tenant 321 of the tenants 320 may request access to additional storage of more than a particular server's (e.g., server #1) available space. Therefore, this tenant 321 may be moved/migrated to at least one other server (e.g., server #2-10) that may have enough storage space or move/migrate other tenants of the tenants 320 from this server (e.g., server #1) to one or more other servers (e.g., server #2-10).

In some examples, when a tenant is moved/migrated to another server, the data of this tenant should also be moved/migrated. Such data movement/migration may be slow when the tenant has large data storage requirement. Therefore, the system described herein may be configured to provide an optimal tenant replacement method for the server cluster/farm 310 that reduces/minimizes data transfer and balance the server load simultaneously. For example, in reference to FIG. 3A, when ten servers 310 are accessed by a group of tenants 320, an arbitrary tenant replacement may lead to load imbalance, as shown by example in graph 330. However, in accordance with aspects of the disclosure, load balance may be achieved by means of an optimization system and various methods described herein to make the server cluster/farm more efficient, as shown by example in graph 340.

In some implementations, a server cluster/farm may include a set of servers $S=(s_1, s_2, \ldots, s_t)$ and a set of tenants $T=(t_1, t_2, \ldots, t_k)$, where multiple tenants may be placed to one server. The load and data size on each server may be denoted by $R^{(S)}=(Load, Disk)$. In some examples, it may be considered important to make sure that the load and data size on each server does not exceed a maximum setting, as well as having a load that is well balanced and data transfer that is as low as possible.

The load balance in a server farm $\mathcal{L}$ may be defined as a variance of load of all servers, where the variance of demand may be expressed as:

$\mathcal{L} = \sum_{i=1}^{|S|}[L_i - \mu]^2$, where $L_i$ is a load of server$_i$ and $\mu$ is an average load of servers in the cluster/farm.

The data transfer $\mathcal{D}$ may be defined as a sum of data size of tenants moved or migrated from one sever to another server, where the sum of storage demand may be expressed as:

$\mathcal{D} = \sum_j^{|T|} f_j \times D_j$, where $D_j$ is the disk space required by tenant$_j$, and $f_j$ equals to 1 when $t_j$ is moved, otherwise $f_j$ equals to 0.

The load balance and data transfer may be normalized and summed up to a fitness function, that may be expressed as:

Fitness $= \alpha \mathcal{L} + (1-\alpha) \mathcal{D}$, where $\alpha$ is a weighting parameter.

Therefore, the problem of tenant management for a server cluster/farm may be reduced to a minimization of the fitness function.

In particular, FIG. 3B is a diagram illustrating an example implementation 350 for managing, coordinating, and optimizing migration scheduling for load balance and data transfer, in accordance with aspects of the disclosure.

In the example of FIG. 3B, a server cluster/farm 360 may include four servers #1-4 with twelve tenants #1-12 assigned to the four servers #1-4. In this example each tenant may request or require access to a certain amount of server resources (e.g., load and disk), and each server #1-4 has a maximum limitation of resources. Further, in reference to this example, Table 1 and Table 2 herein provide/describe available resources requested/required in/by each server and tenant.

TABLE 1

Tenant placement in each server.

| Server | #1 | #2 | #3 | #4 |
|--------|----|----|----|----|
| Load   | 10 | 20 | 40 | 15 |
| Disk   | 15 | 15 | 10 | 40 |

TABLE 2

Tenant requirement.

| | Tenant | | | | | | | | | | | |
|---|---|---|---|---|---|---|---|---|---|---|---|---|
| | #1 | #2 | #3 | #4 | #5 | #6 | #7 | #8 | #9 | #10 | #11 | #12 |
| Load | 1 | 2 | 10 | 2 | 8 | 5 | 1 | 3 | 3 | 10 | 5 | 8 |
| Disk | 2 | 2 | 2 | 2 | 1 | 10 | 5 | 1 | 30 | 2 | 6 | 4 |

Since each server #1-12 may be accessed by multiple tenants, while each tenant may be placed with one unique server, a binary vector $V=(v_1, v_2, v_3, v_4)$ may be used to indicate whether a tenant #1-4 may access a certain server.

For example, $V(t_1)=(1, 0, 0, 0)$ means that tenant $t_1$ is in server #1. In this example, there may be $4^{12}=16,777,216$ combinations of tenants and servers.

An enumerative method may examine each combination and calculate a value for the fitness function and then return a value that does not exceed a maximum limitation in the servers #1-4 and has a minimum fitness value.

In some examples, a server cluster/farm with S servers and T tenants may have $S^T$ combinations needed to enumerate, and therefore, it may be not possible for a modern computer to find a global optimal in an acceptable time.

Figure 4:
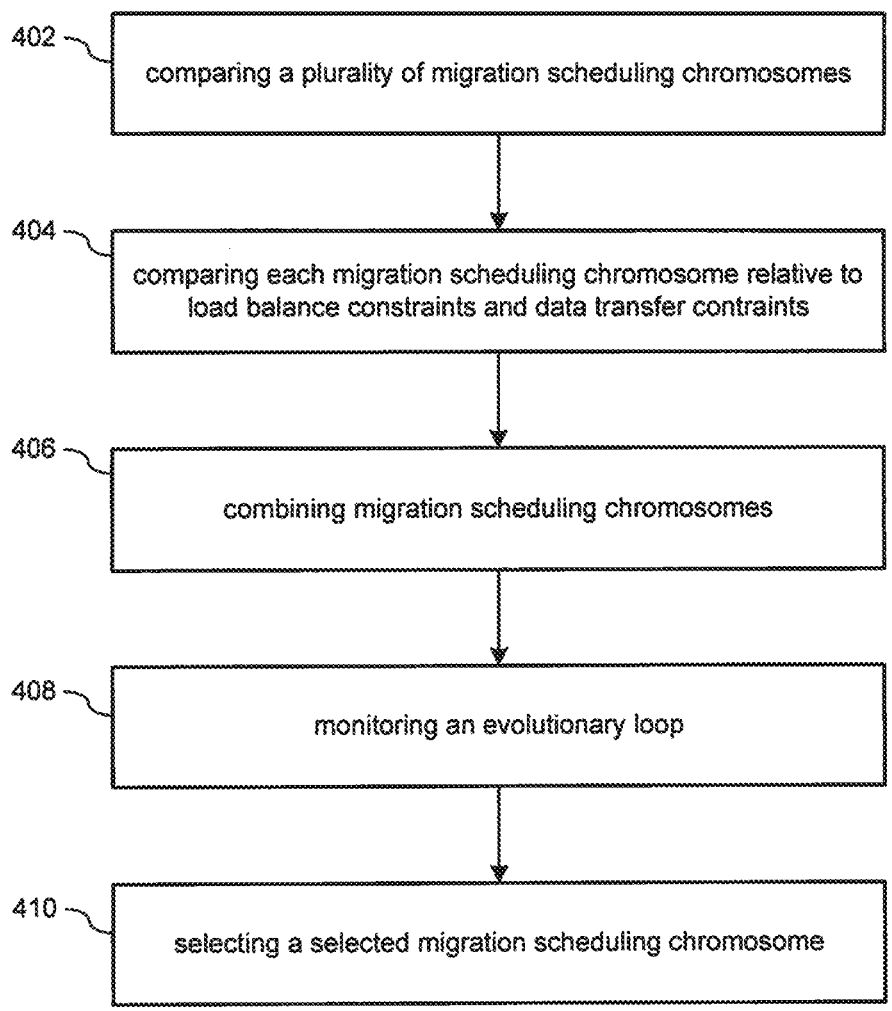
FIGS. 4-7 are process flows illustrating various example methods for managing migration scheduling, in accordance with aspects of the disclosure.

FIG. 4 is a process flow illustrating another example method 400 for managing migration scheduling, in accordance with aspects of the disclosure.

In the example of FIG. 4, operations 402-410 are illustrated as discrete operations occurring in sequential order. However, it should be appreciated that, in other implementations, two or more of the operations 402-410 may occur in a partially or completely overlapping or parallel manner, or in a nested or looped manner, or may occur in a different order than that shown. Further, additional operations, that may not be specifically illustrated in the example of FIG. 4, may also be included in some implementations, while, in other implementations, one or more of the operations 402-410 may be omitted. Further, in various implementations, the method 400 may include a process flow for a computer-implemented method for managing migration scheduling in the system 100 of FIG. 1A and the system 150 of 1B. Further, as described herein, the operations 402-410 may provide an expanded operational process flow for operation 210 of method 200 of FIG. 2 that may be enacted by the computer system 104 to provide features and functionalities as described in reference to FIGS. 1A and 1B.

In an aspect of the disclosure, the method 400 of FIG. 4 may be provided for generating one or more potential migration scheduling schemes for each server resource 160A, 160B, . . . , 160N based on migration events for each server resource 160A, 160B, . . . , 160N.

In the example of FIG. 4, at 402, the method 400 may include comparing a plurality of migration scheduling chromosomes, wherein each migration scheduling chromosome may include one or more potential migration scheduling schemes for use of each server resource 160A, 160B, . . . , 160N within one or more time intervals while considering load balance constraints and data transfer constraints.

At 404, the method 400 may include comparing each migration scheduling chromosome relative to the load balance constraints and data transfer constraints to thereby output a selected subset of the plurality of migration scheduling chromosomes.

At 406, the method 400 may include combining migration scheduling chromosomes of the selected subset of the plurality of migration scheduling chromosomes to obtain a next generation of migration scheduling chromosomes for output and for subsequent comparison therewith of the next generation of migration scheduling chromosomes with respect to the one or more constraints, as part of an evolutionary loop of the plurality of migration scheduling chromosomes.

At 408, the method 400 may include monitoring the evolutionary loop, and at 410, the method 400 may include selecting a selected migration scheduling chromosome therefrom for implementation of a migration event schedule based thereon.

In some implementations, the method 400 may further include combining the migration scheduling chromosomes including selecting pairs of migration scheduling chromosomes and crossing over portions of each pair of migration scheduling chromosomes to obtain a child chromosome of the next generation.

In some implementations, the method 400 may further include executing at least a portion of the evolutionary loop using parallel processes in which each generation of migration scheduling chromosomes is divided into sub-groups for parallel processing thereof.

In some implementations, the method 400 may further include selecting the selected migration scheduling chromosome after a predetermined number of generations of the evolutionary loop, or after determining that the selected migration scheduling chromosome satisfies the one or more constraints to a predetermined extent.

Figure 5:
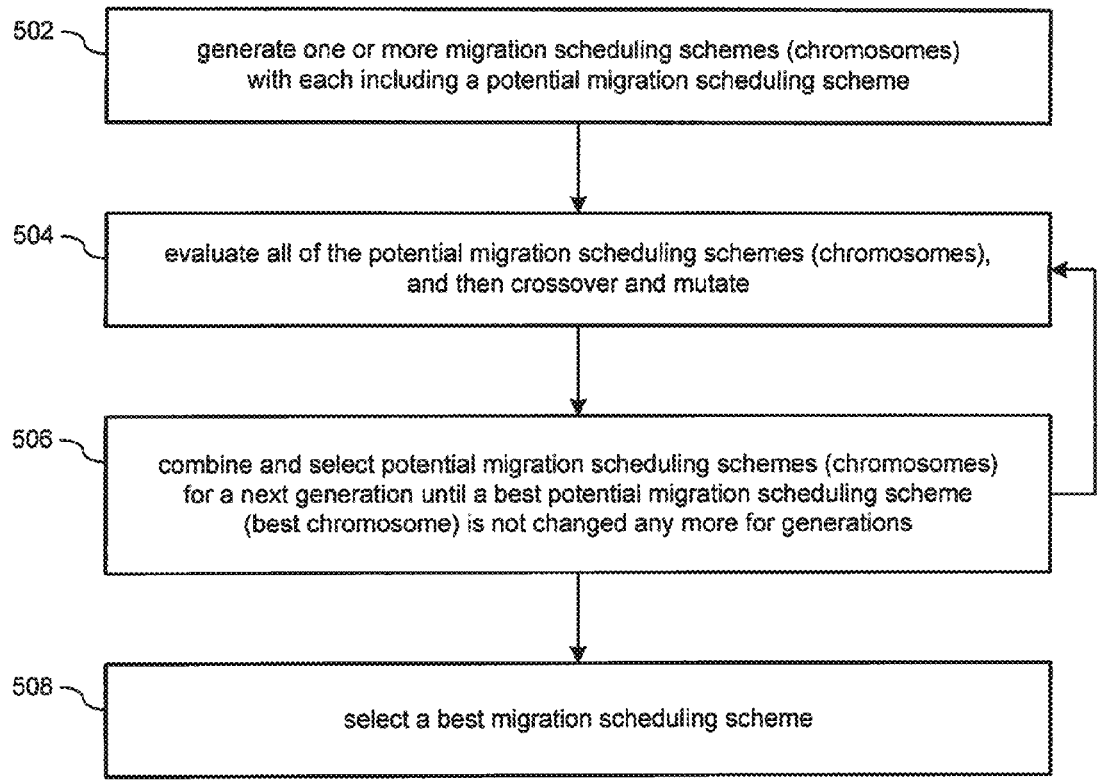

FIG. 5 is a process flow illustrating another example method 500 for managing migration scheduling by implementing a forecast algorithm or a genetic algorithm for migration scheduling, in accordance with aspects of the disclosure.

In the example of FIG. 5, operations 502-508 are illustrated as separate, sequential operations. However, it should be appreciated that two or more of the operations 502-508 may be conducted in a partially or completely overlapping or parallel manner. Moreover, the operations 502-508 may be implemented in a different order than that shown, and it should be appreciated that additional or alternative operations, not specifically illustrated in the example of FIG. 5, may be included, and one or more of the operations 502-508 may be omitted. Further, as illustrated with respect to the operations 510-508, various ones of the operations 502-508 may be implemented in an iterative, looped, or nested fashion, or otherwise may be implemented in an order and manner consistent with obtaining a desired migration scheduling result from one or more of the system 100 of FIG. 1 and the system 150 of FIG. 1B.

At 502, the method 500 may be configured to generate one or more migration scheduling schemes (chromosomes), wherein each generated migration scheduling scheme (chromosome) includes a potential migration scheduling scheme. In an example, the systems 100, 150 may be configured to compare a plurality of migration scheduling chromosomes, wherein each migration scheduling chromosome includes one or more potential migration scheduling schemes for each server resource 160A, 160B, ..., 160N within the one or more time intervals based on the migration events for each server resource 160A, 160B, ..., 160N and/or while considering the load balance constraints and/or the data transfer constraints for each server resource 160A, 160B, ..., 160N. The systems 100, 150 may be further configured to compare each of the plurality of migration scheduling chromosomes relative to the migration events, the load balance constraints and/or the data transfer constraints, to thereby output a selected subset of the plurality of migration scheduling chromosomes. The systems 100, 150 may be further configured to combine the migration scheduling chromosomes of the selected subset of the plurality of migration scheduling chromosomes to obtain a next generation of migration scheduling chromosomes and for subsequent comparison therewith of the next generation of migration scheduling chromosomes with respect to the migration events, the load balance constraints and/or the data transfer constraints, as part of an evolutionary loop of the plurality of migration scheduling chromosomes. The systems 100, 150 may be further configured to monitor the evolutionary loop and select a selected migration scheduling chromosome therefrom for implementation of the migration scheduling based thereon.

In the example of FIG. 5, at 504, the method 500 may be configured to evaluate all of the potential migration scheduling schemes (chromosomes), and then crossover and mutate. For instance, the systems 100, 150 may be configured to use a forecast algorithm or a genetic algorithm to crossover one or more of the chromosomes by combining the chromosomes in a role of parents to execute a simulation of sexual crossover to obtain a new child chromosome, which may be part of a new generation of chromosomes that may provide further crossover with other members of the same generation as part of an evolutionary loop to optimize the migration scheduling process.

Therefore, the systems 100, 150 may be configured to provide a forecast algorithm or a genetic algorithm as a computer simulation of Darwinian natural selection that iterates through various generations to converge toward a best solution in the problem space. Further, in reference to mutation, one of the chromosomes may be randomly selected, then a position (i.e., gene) within the selected chromosome may be selected for mutation, and then the value of the randomly selected position (i.e., gene) may be randomly changed or mutated to produce one or more new characteristics that were not previously available.

At 506, the method 500 may be configured to combine and select potential migration scheduling schemes (chromosomes) for a next generation until a best potential migration scheduling scheme (best chromosome) is not changed any more for generations. In an example, the operations at 510 and 512 maybe repeated or cycled until the best potential migration scheduling scheme (best chromosome) is achieved for subsequent selection. For instance, by using a forecast algorithm or a genetic algorithm, a best reasonable migration scheduling scheme may be selected or determined for one or more forthcoming migration scheduling in a closed circle or loop.

At 508, the method 500 may be configured to select a best migration scheduling scheme with an optimized or maximized migration event schedule. In an example, by using the forecast algorithm or genetic algorithm, a best or most reasonable migration scheduling scheme may be selected or determined for at least one forthcoming migration event schedule in reference to each server resource 160A, 160B, ..., 160N while considering the optimized or maximized migration event schedule for each server resource 160A, 160B, ..., 160N.

Figure 6:
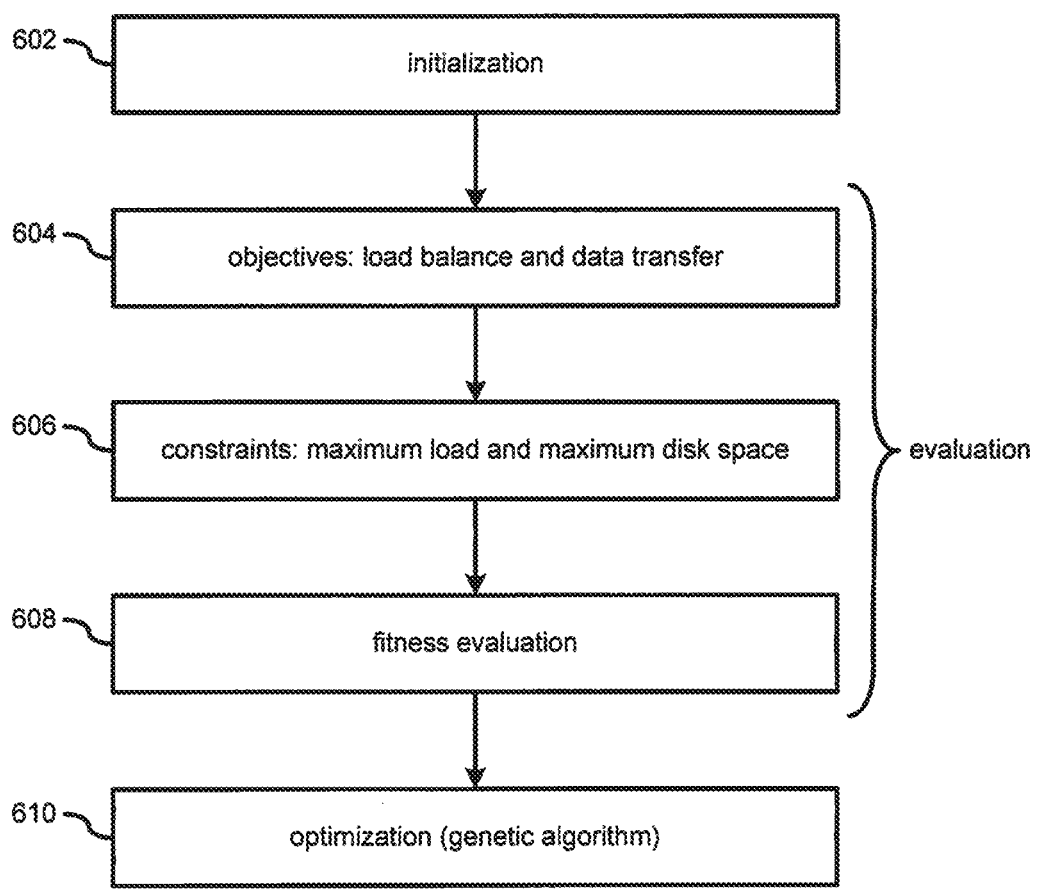
Figure 7:
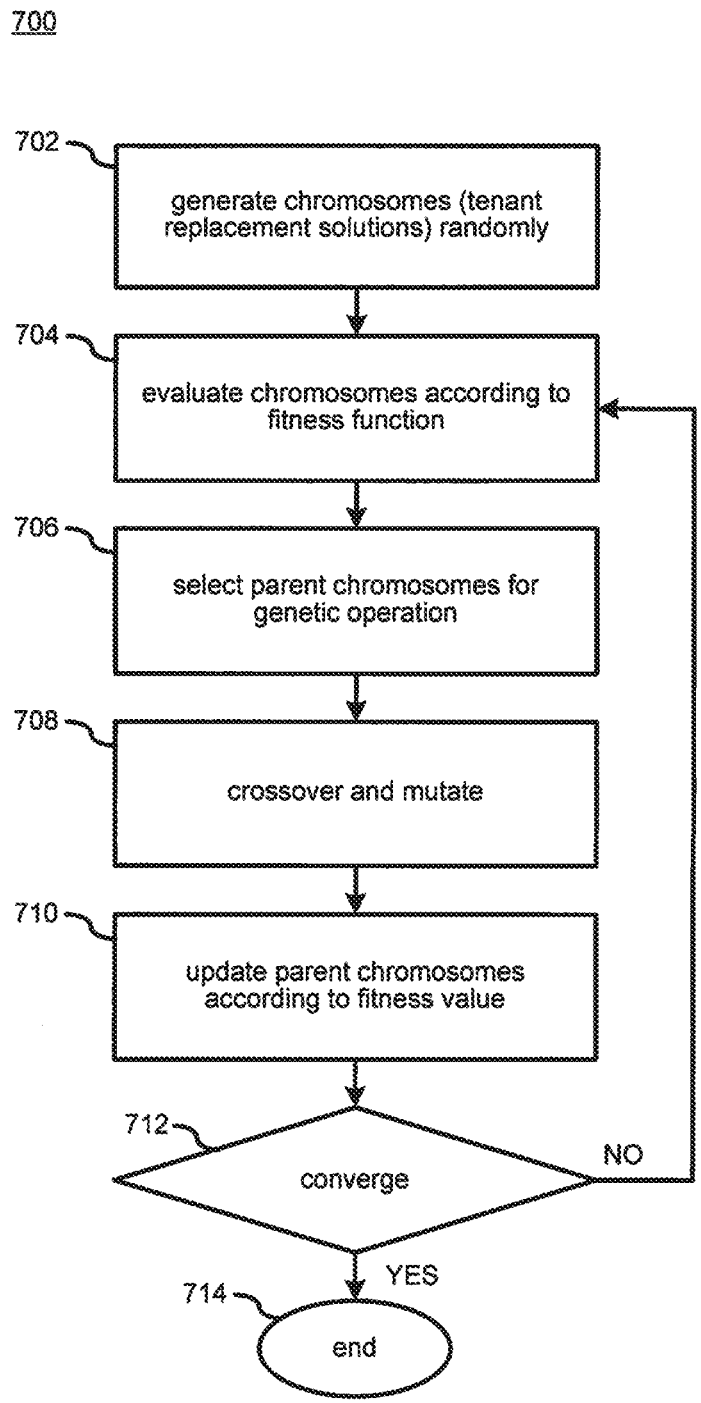

In accordance with aspects of the disclosure, the genetic algorithm (GA) may be referred to as a search heuristic that may be adapted to mimic process(es) of natural evolution. This heuristic may be routinely used to generate useful solutions in reference to optimization and search problems. In some implementations, as described herein, a tenant management problem/solution has at least two objectives. For instance, a first objective may be to minimize a variance of server's load, and in another instance, a second objective may be to reduce a total data transfer. An example flowchart of a GA based migration management method/process is shown in FIG. 6, and further, an example flowchart of a GA is shown in FIG. 7. In various implementations, the load balance constraints may include load balance objectives, and the data transfer constraints may include data transfer objectives. In other implementations, the load balance constraints may include load constraints for each server resource 160A, 160B, . . . , 160N in the server cluster 160, and the data transfer constraints may include data constraints for each server resource 160A, 160B, . . . , 160N in the server cluster 160.

In the example of FIG. 6, operations 602-610 are illustrated as discrete operations occurring in sequential order. However, it should be appreciated that, in other implementations, two or more of the operations 602-610 may occur in a partially or completely overlapping or parallel manner, or in a nested or looped manner, or may occur in a different order than that shown. Further, additional operations, that may not be specifically illustrated in the example of FIG. 6, may also be included in some implementations, while, in other implementations, one or more of the operations 602-610 may be omitted. Further, in various implementations, the method 600 may include a process flow for a computer-implemented method for managing migration scheduling in the system 100 of FIG. 1A and the system 150 of 1B.

In reference to FIG. 6, at 602, the method 600 may include initialization phase followed by an evaluation phase 604, 606, 608, and further followed by a optimization phase 610. At 604, the method 600 may include determining one or more objectives including load balance and data transfer. At 606, the method 600 may include determining one or more constraints including maximum load constraints and maximum disk space constraints. At 608, the method 600 may include fitness evaluation. At 610, the method 600 may include optimization using a genetic algorithm.

In the example of FIG. 7, operations 702-710 are illustrated as discrete operations occurring in sequential order. However, it should be appreciated that, in other implementations, two or more of the operations 702-710 may occur in a partially or completely overlapping or parallel manner, or in a nested or looped manner, or may occur in a different order than that shown. Further, additional operations, that may not be specifically illustrated in the example of FIG. 7, may also be included in some implementations, while, in other implementations, one or more of the operations 702-710 may be omitted. Further, in various implementations, the method 700 may include a process flow for a computer-implemented method for managing migration scheduling in the system 100 of FIG. 1A and the system 150 of 1B.

In reference to FIG. 7, at 702, the method 700 may include generating chromosomes (e.g., migration scheduling chromosomes, which may be referred to as tenant replacement solutions) randomly. At 704, the method 700 may include evaluating chromosomes according to the fitness function. At 706, the method 700 may include selecting parent chromosomes for genetic operation, in a manner as described further herein. At 708, the method 700 may include crossing-over and mutating the chromosomes, in a manner as described further herein. At 710, the method 700 may include updating the parent chromosomes according to the fitness value calculated with the fitness function. At 712, the method 700 may include determining whether to converge the updated parent chromosomes. If no, the process flow returns to 704 to evaluate chromosomes according to the fitness function. If yes, the parent chromosomes are converged and the process flow of the method 700 terminates/ends at 714.

In the example of FIG. 7, chromosomes may be encoded as a fixed-length real string to express a tenant replacement solution. In some implementations, genes in the chromosomes may be ordered in terms of a tenant identification (ID), such as in the example chromosome as is shown in FIG. 8.

Figure 8:
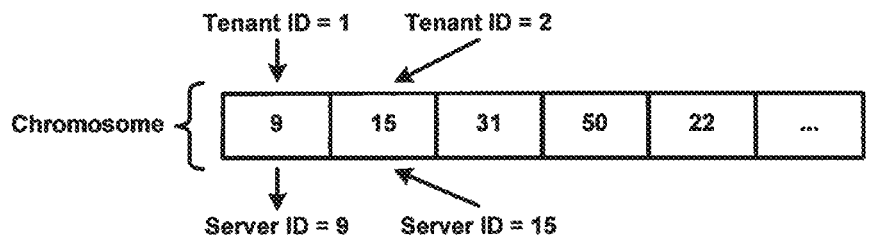
FIG. 8 shows an example chromosome, in accordance with aspects of the disclosure.

FIG. 8 shows an example chromosome 800, in accordance with aspects of the disclosure. In some implementations, the chromosome 800 may include a series of regions (i.e., a sequence of positional regions with associated values included therein) representing chromosomal tenant/server relationships defined by/with a tenant ID as a position in the chromosome and further defined by/with a server ID as a value of or in the corresponding positional region. For example, as shown in FIG. 8, tenant ID=1 is a first position or a first positional region in the chromosome 800 with a server ID value of 9, and in another example, as shown in FIG. 8, tenant ID=2 is a second position or second positional region in the chromosome 800 with a server ID value of 15, and so on with third, fourth, fifth, etc., n-th positional regions.

Figure 9:
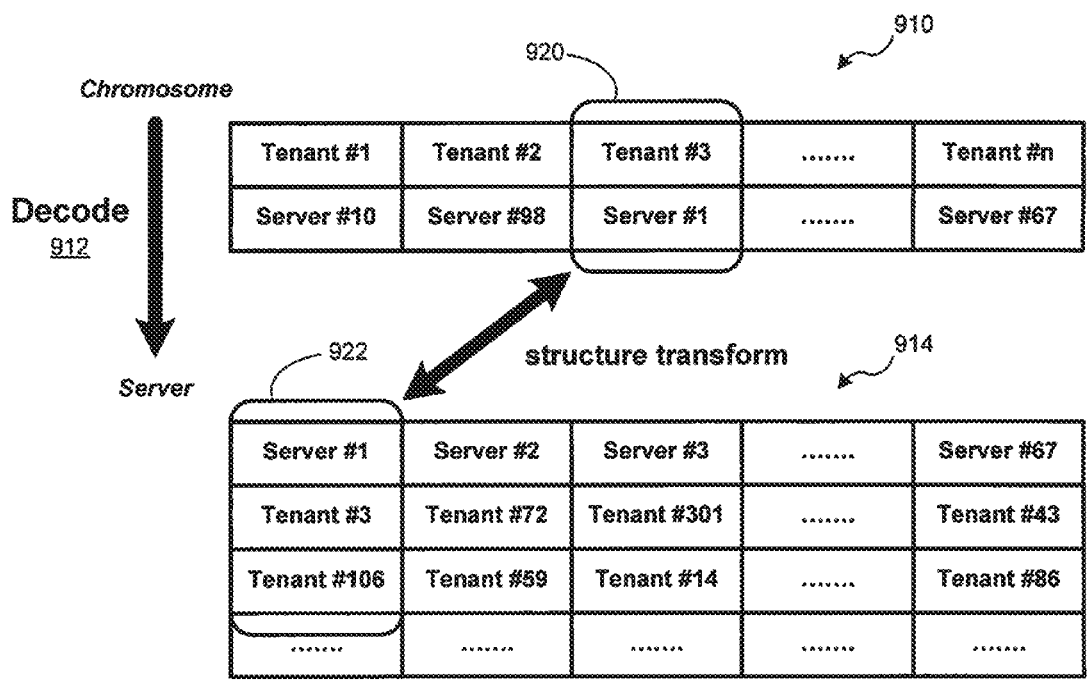
FIG. 9 shows an example decoding of a chromosome, in accordance with aspects of the disclosure.

FIG. 9 shows an example decoding 900 of a chromosome, in accordance with aspects of the disclosure. In some implementations, a chromosome 910 may be decoded 912 into a server table 914 to express tenant/server relationships.

In some implementations, a structure transform may be performed where a tenant/server relationship in a chromosome may be decoded to indicate which particular tenants are assigned to which particular servers. For instance, as shown in the example of FIG. 9, a structure transform may be performed where a tenant/server relationship 920 of tenant #3 to server #1 in the chromosome 910 may be decoded to indicate, in particular, a corresponding tenant/server relationship 922 in the server table 914 of tenants #3, #106, etc. assigned to server #1.

In some implementations, in reference to chromosome evaluation, the load balance and data transfer among the servers may be denoted by $\mathcal{L}$ and $\mathcal{D}$, in a manner as described herein. The load and data size for the i-th server may be denoted by $L_i$ and $D_i$, and the maximum load and the maximum space on the i-th server may be denoted by $L_{max-i}$ and $D_{max-i}$. In some examples, a penalty for violating the load balance constraints and data transfer constraints may be expressed by:

$$\text{Penalty}_i = \begin{cases} \beta(L_{max-i} - L_i), & if L_i > L_{max-i} \\ (1-\beta)(D_{max-i} - D_i), & if D_i > D_{max-i} \\ \beta(L_{max-i} - L_i) + \\ (1-\beta)(D_{max-i} - D_i), & if L_i > L_{max-i} \text{ AND } D_i > D_{max-i} \\ 0, & others \end{cases}$$

and the fitness may be expressed by:

$$\text{Fitness} = \alpha \mathcal{L} + (1-\alpha)\mathcal{D} + \Sigma_i \text{Penalty}_i$$

where $\alpha$ and $\beta$ are parameters to trade off, and all the variables may be normalized beforehand.

Figure 10A:
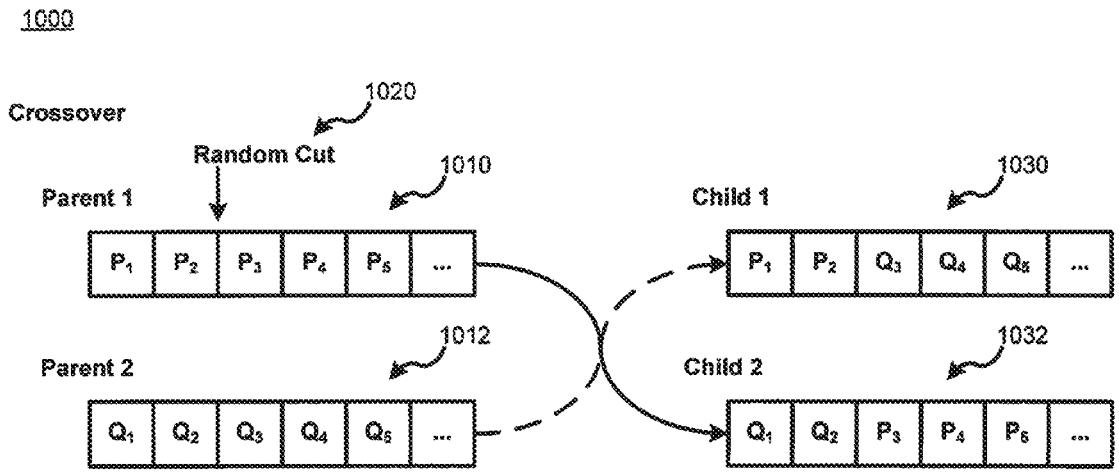
FIGS. 10A-10B show example crossover and mutation of chromosomes, in accordance with aspects of the disclosure.
Figure 10B:
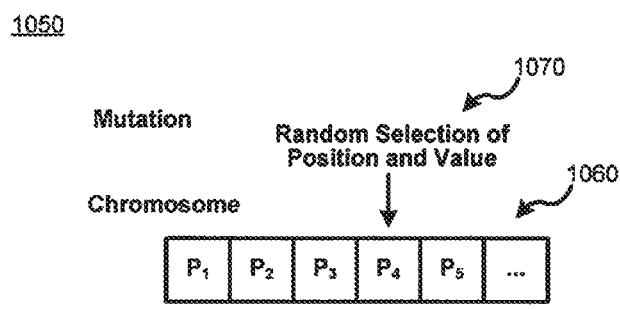

FIGS. 10A-10B show example crossover and mutation of chromosomes, in accordance with aspects of the disclosure.

In particular, FIG. 10A shows an example crossover 1000 of at least two parent chromosomes, and FIG. 10A shows an example mutation 1050 of a chromosome, in accordance with aspects of the disclosure.

In the example of FIG. 10A, in reference to performing a crossover, a single cut 1020 may be implemented randomly for at least two parent chromosomes 1010, 1012. As a result of the crossover, two child chromosomes 1030, 1032 may be generated by crossing and recombining the at least two parent chromosomes 1010, 1012, in a manner as shown in FIG. 10A.

In the example of FIG. 10B, in reference to performing a mutation, a position and value may be selected randomly 1070 for a chromosome 1060. As a result of the mutation, the value of the randomly selected position may be randomly altered or changed to generate a mutation at that selected position of the chromosome 1060.

In accordance with aspects of the disclosure, the techniques described herein may be represented by the following example pseudo code.

| PSEUDO CODE |
| --- |
| % Optimization |
| % NumOfChrom: number of chromosomes in GA population |
| % MaxGen: max number of generation |
| % CrosRate: cross rate |
| % MutaRate: mutation rate |
| %ParentChrom: parent chromosomes |
| % ChildChrom: child chromosomes |
| % InterChrom: combination of parent chromosomes and child chromosomes |
|   1.    FUNCTION Optimization |
|   2.    BEGIN |
|           % Initialization: a chromosome represents a possible solution of tenant replacement |
|   3.    Initialize NumOfChrom chromosomes randomly |
|   4.      ParentChrom = Chromosomes |
|   5.    WHILE NOT CONVERGED |
|   6.    CALL FUNCTION CrossoverAndMutation(ParentChrom, CrosRate, MutaRate) |
|   7.      Combine ParentChrom and ChildChrom, which is denoted as InterChrom |
| % Fitness Evaluation |
|   8.    CALL FUNCTIONFitness = Evaluate(InterChrom) |
|   9.      Sort InterChrom according to Fitness |
| 10.      Select the top NumOfChrom as ParentChrom for the next generation |
| 11.    ENDWHILE |
| 12.    END |
| % CrossoverAndMutation |
| % CrosRate: cross rate |
| % MutaRate: mutation rate |
| %ParentChrom: parent chromosomes |
| % ChildChrom: child chromosomes |
| % NumOfChildChrom: the number of child chromosome |
| 13.    FUNCTIONChildChrom = CrossoverAndMutation (ParentChrom, CrosRate, MutaRate) |
| 14.    BEGIN |
| 15.    WHILENumOfChildChrom<NumOfChrom |
| 16.    IFrand( ) <CrosRate |
| 17.      Randomly select two parent chromosomes ParentChrom[1] and ParentChrom[2] |
| 18.      Randomly select a position where crossover will happen, donated by p (1<p<NumOfTena) |
| 19.      Swap ParentChrom[1][1:p] and ParentChrom[2][1:p] |
| 20.    END IF |
| 21.    IFrand( ) <MutaRate |
| 22.      Randomly select one parent chromosome |
| 23.      Randomly select one position where the mutation will happen |
| 24.      Randomly change the value of selected gene into others gene $\in$ServID |
| 25.    END IF |
| 26.    END WHILE |
| 27.    END |
| % Evaluation |
| % VarOfLoad: variance of load in server farm |
| % AmountOfDataMov: amount of tenants' data transferred to other server |
| % TotalDataMov: total amount of transfer data |
| % ServLoad: load of a server |
| % ServData: total amount of data of a server |
| % MaxLoad: maximum load of a server |
| % MaxData: maximum disk of a server |
| % $\alpha$: weight parameter to trade-off between load balance and data transfer |
| % $\beta$: penalty parameter |
| 28.    FUNCTION Fitness = Evaluate(InterChrom) |
| 29.    BEGIN |
| 30.      FOR EACH Chrom IN InterChrom |
|     % Calculate load and data amount for each server |
| 31.      CALL FUNCTION (ServLoad, ServData, TotalDataMov) = LoadAndDataMov(Chrom) |
|     % Calculate variance of load of the servers |
| 32.    VarOfLoad = var(ServLoad) |
| 33.    Normalization VarOfLoad and TotalDataMov |
| 34.    Score = $\alpha$*VarOfLoad +(1–$\alpha$)* TotalDataMov |
| 35.    Penalty = 0 |
| 36.    Normalization MaxLoad –ServLoad and MaxData–ServData |
| 37.    IFServLoad> MaxLoad |

-continued

PSEUDO CODE

```
38.     Penalty = β*(MaxLoad −ServLoad)
39.   ELSEIFServData> MaxData
40.     Penalty = (1−β)*(MaxData−ServData)
41.   ELSE
42.     Penalty = β*(MaxLoad −ServLoad) + (1−β)*(MaxData−ServData)
43.   ENDIF
44.   Fitness = Score + Penalty
45.   END
                                          % LoadAndDataMov
% AmountOfData: amount a tenant's data
% AmountOfLoad: amount of a tenant's load
% AmountOfDataMov: amount of data transfer of a tenant
% ServLoad: load of a server
% ServData: total amount of data of a server
% TotalDataMov: amount of data transfer of all tenants
46.   FUNCTION (ServLoad, ServData, TotalDataMov) = LoadAndDataMov(Chrom)
47.   BEGIN
% Transform data format as shown in FIG. 9
48.   Chromosome decode
49.   FOR ServID := 1 to NumOfServ
50.   FORTenaID:= 1 to NumOfTena
51.     ServLoad[ServID] = Σ_{TenaID} AmountOfLoad[ServID, TenaID]
52.     ServData[ServID] = Σ_{TenaID} AmountOfData[ServID, TenaID]
53.     IFChrom.Tena[TenaID] is moved to another server
54.     AmountOfDataMov[ServID] = Σ_{TenaID} AmountOfData[ServID, TenaID]
55.     ELSEIF Chrom.Tena[TenaID] is new OR Chrom.Tena[TenaID] is not moved
56.     Continue
57.     ENDIF
58.   ENDFOR
59.   ENDFOR
% Calculate total amount of data transfer
60.   TotalDataMov = Σ_{ServID} AmountOfDataMov[ServID]
61.   END
% ServerStructure
% ServID: Server ID
% NumOfTena: the number of tenants in the server
% MaxLoad: max limit of load of the server
% MaxData: max disk space of the server
62.   Structure Server
63.   {
64.   int ServID;
65.   double MaxLoad;
66.   double MaxData;
67.   Tenant Tena[NumOfTena]
68.   }
% Tenant Structure
% TenaID: Tenant ID
% AmountOfData: amount of data of a tenant
% AmountOfLoad: amount of load of a tenant
69.   Structure Tenant
70.   {
71.   intTenaID;
72.   double AmountOfData;
73.   double AmountOfLoad;
74.   }
% Chromosome Structure
75.   Structure Chromosome
76.   {
77.   int chrom[NumOfTana];
78.   }
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system comprising:
   at least one processor;
   a memory;
   a non-transitory computer-readable medium storing instructions that are executable by the at least one processor in conjunction with the memory, the computer system coupled to a plurality of server resources in a server cluster, wherein the computer system includes:
   a tenant replacement manager causing the at least one processor to schedule migration events for each of the plurality of server resources in the server cluster relative to a time interval while considering load balance constraints and data transfer constraints of the server cluster, the tenant replacement manager including:
   a load balance handler determining the load balance constraints of the server cluster, wherein the load balance constraints of the server cluster is defined as a variance of load demand of the server resources in the server cluster, the variance of load demand is expressed as $\mathcal{L} = \Sigma_{i=1}^{|S|}[L_i - \mu]^2$, where $L_i$ is a load of the server resources $s_i$ and $\mu$ is an average load of the server resources;
   a data transfer handler determining the data transfer constraints of the server cluster;
   a migration event coordinator generating one or more migration scheduling schemes for migration of each server resource to at least one other server resource in the server cluster within the time interval while considering the load balance constraints and the data transfer constraints of the server; and
   a migration event scheduling optimizer generating a migration event schedule for each migration event within the time interval based on the one or more migration scheduling schemes generated for migration of each server resource to at least one other server resource in the server cluster,
   wherein the computer system migrates the server resources in the server cluster according to the generated migration event schedule.

2. The system of claim 1, wherein:
   the plurality of server resources includes a set of servers, and
   the server cluster includes the set of servers connected by a network to a set of tenants.

3. The system of claim 1, wherein:
   each server resource of the server cluster is accessible to one or more tenants requesting access to the plurality of server resources of the server cluster including access to computing resources and access to storage resources.

4. The system of claim 1, wherein:
   the data transfer constraints of the server cluster is defined as a sum of storage demand of the server resources in the server cluster based on one or more tenants migrating from one server resource to another server resource, the sum of storage demand is expressed as:
   $\mathcal{D} = \Sigma_j^{|T|} f_j \times D_j$, where $D_j$ is a disk space demanded by a tenant $t_j$, and $f_j$ equals to 1 when $t_j$ is migrated, otherwise $f_j$ equals to zero.

5. The system of claim 4, wherein:
   the load balance constraints and the data transfer constraints are normalized and summed in a fitness function with a weighting parameter, the fitness function is expressed as:
   Fitness=$\alpha \mathcal{L} + (1-\alpha)\mathcal{D}$, where $\alpha$ is the weighting parameter.

6. The system of claim 1, wherein:
   the migration event coordinator receives each load balance constraint and each data transfer constraint as an input for modeling as a chromosome by the migration event coordinator, and
   the migration event coordinator generates the one or more migration scheduling schemes based on each load balance constraint and each data transfer constraint that is modeled as the chromosome.

7. The system of claim 1, wherein the migration event coordinator comprises:
   a genetic algorithm handler including a chromosome comparator comparing a plurality of migration scheduling chromosomes, each migration scheduling chromosome including the one or more potential migration scheduling schemes for migration of each server resource to at least one other server resource in the server cluster within the time interval while considering the load balance constraints and the data transfer constraints of the server cluster, and comparing each of the plurality of migration scheduling chromosomes relative to the load balance constraints and the data transfer constraints, to thereby output a selected subset of the plurality of migration scheduling chromosomes; and a chromosome combiner combining migration scheduling chromosomes of the selected subset of the plurality of migration scheduling chromosomes to obtain a next generation of migration scheduling chromosomes for output to the chromosome comparator and for subsequent comparison therewith of the next generation of migration scheduling chromosomes with respect to the load balance constraints and the data transfer constraints, as part of an evolutionary loop of the plurality of migration scheduling chromosomes between the chromosome comparator and the chromosome combiner, wherein the migration event scheduling optimizer monitors the evolutionary loop and select a selected migration scheduling chromosome therefrom for implementation of the migration event schedule based thereon.

8. The system of claim 7, wherein the chromosome combiner combines the migration scheduling chromosomes including selecting pairs of migration scheduling chromosomes and crossing over portions of each pair of migration scheduling chromosomes to obtain a child chromosome of the next generation.

9. The system of claim 7, wherein at least a portion of the evolutionary loop is executed using parallel processes in which each generation of migration scheduling chromosomes is divided into sub-groups for parallel processing thereof.

10. The system of claim 7, wherein the migration event scheduling optimizer selects the selected migration scheduling chromosome after a predetermined number of generations of the evolutionary loop, or after determining that the selected migration scheduling chromosome satisfies the load balance constraints and the data transfer constraints to a predetermined extent.

11. A computer program product, the computer program product being tangibly embodied on a non-transitory computer-readable storage medium and comprising instructions that, when executed by at least one processor, cause a computer system to:

schedule migration events for each of a plurality of server resources in a server cluster relative to a time interval while considering load balance constraints and data transfer constraints of the server cluster, wherein the load balance constraints of the server cluster is defined as a variance of load demand of the server resources in the server cluster, the variance of load demand is expressed as $\mathcal{L} = \sum_{i=1}^{|S|} [L_i - \mu]^2$, where $L_i$ is a load of the server resources $s_i$ and $\mu$ is an average load of the server resources;

determine the load balance constraints of the server cluster;
determine the data transfer constraints of the server cluster;
generate one or more migration scheduling schemes for migration of each server resource to at least one other server resource in the server cluster within the time interval while considering the load balance constraints and the data transfer constraints of the server cluster;
generate a migration event schedule for each migration event within the time interval based on the one or more migration scheduling schemes generated for migration of each server resource to at least one other server resource in the server cluster; and
migrate server resources in the server cluster according to the generated migration event schedule.

12. The computer program product of claim 11, wherein the data transfer constraints of the server cluster is defined as a sum of storage demand of the server resources in the server cluster based on one or more tenants migrating from one server resource to another server resource, the sum of storage demand is expressed as:

$\mathcal{D} = \sum_{j}^{|T|} f_j \times D_j$, where $D_j$ is a disk space demanded by a tenant $t_j$, and $f_j$ equals to 1 when $t_j$ is migrated, otherwise $f_j$ equals to zero.

13. The computer program product of claim 12, wherein:
the load balance constraints and the data transfer constraints are normalized and summed in a fitness function with a weighting parameter, the fitness function is expressed as:
Fitness=$\alpha \mathcal{L} + (1-\alpha) \mathcal{D}$, where $\alpha$ is the weighting parameter.

14. The computer program product of claim 11, further comprising instructions that, when executed by the processor, cause the computer system to:

compare a plurality of migration scheduling chromosomes, each migration scheduling chromosome including the one or more potential migration scheduling schemes for migration of each server resource to at least one other server resource in the server cluster within the time interval while considering the load balance constraints and the data transfer constraints of the server cluster;

compare each of the plurality of migration scheduling chromosomes relative to the load balance constraints and the data transfer constraints, to thereby output a selected subset of the plurality of migration scheduling chromosomes;

combine migration scheduling chromosomes of the selected subset of the plurality of migration scheduling chromosomes to obtain a next generation of migration scheduling chromosomes for output and for subsequent comparison therewith of the next generation of migration scheduling chromosomes with respect to the load balance constraints and the data transfer constraints, as part of an evolutionary loop of the plurality of migration scheduling chromosomes; and monitor the evolutionary loop and select a selected migration scheduling chromosome therefrom for implementation of the migration event schedule based thereon.

15. The computer program product of claim 14, further comprising instructions that, when executed by the processor, cause the computer system to:

combine the migration scheduling chromosomes including selecting pairs of migration scheduling chromosomes and crossing over portions of each pair of migration scheduling chromosomes to obtain a child chromosome of the next generation;

execute at least a portion of the evolutionary loop using parallel processes in which each generation of migration scheduling chromosomes is divided into sub-groups for parallel processing thereof; and select the selected migration scheduling chromosome after a predetermined number of generations of the evolutionary loop, or after determining that the selected migration scheduling chromosome satisfies the load balance constraints and the data transfer constraints to a predetermined extent.

16. A computer-implemented method, comprising:
scheduling migration events for each of a plurality of server resources in a server cluster relative to a time interval while considering load balance constraints and data transfer constraints of the server cluster by:

determining the load balance constraints of the server cluster;

determining the data transfer constraints of the server cluster;

generating one or more migration scheduling schemes for migration of each server resource to at least one other server resource in the server cluster within the time interval while considering the load balance constraints and the data transfer constraints of the server cluster; and generating a migration event schedule for each migration event within the time interval based on the one or more potential migration scheduling schemes generated for migration of each server resource to at least one other server resource in the server cluster; and migrating server resources in the server cluster according to the generated migration event schedule.

17. The method of claim 16, further comprising:

comparing a plurality of migration scheduling chromosomes, each migration scheduling chromosome including the one or more migration scheduling schemes for migration of each server resource to at least one other server resource in the server cluster within the time interval while considering the load balance constraints and the data transfer constraints of the server cluster;

comparing each of the plurality of migration scheduling chromosomes relative to the load balance constraints and the data transfer constraints, to thereby output a selected subset of the plurality of migration scheduling chromosomes;

combining migration scheduling chromosomes of the selected subset of the plurality of migration scheduling chromosomes to obtain a next generation of migration scheduling chromosomes for output to the chromosome comparator and for subsequent comparison therewith of the next generation of migration scheduling chromosomes with respect to the load balance constraints and the data transfer constraints, as part of an evolutionary loop of the plurality of migration scheduling chromosomes; and monitoring the evolutionary loop and select a selected migration scheduling chromosome therefrom for implementation of the migration event schedule based thereon.

18. The method of claim 17, further comprising:

combining the migration scheduling chromosomes including selecting pairs of migration scheduling chromosomes and crossing over portions of each pair of migration scheduling chromosomes to obtain a child chromosome of the next generation;

executing at least a portion of the evolutionary loop using parallel processes in which each generation of migration scheduling chromosomes is divided into sub-groups for parallel processing thereof; and selecting the selected migration scheduling chromosome after a predetermined number of generations of the evolutionary loop, or after determining that the selected migration scheduling chromosome satisfies the load balance constraints and the data transfer constraints to a predetermined extent.

19. The method of claim 16, wherein:

the load balance constraints of the server cluster is defined as a variance of load demand of the server resources in the server cluster, the variance of load demand is expressed as:

$\mathcal{L} = \Sigma_{i=1}^{|S|}[L_i - \mu]^2$, where $L_i$ is a load of the server resources $s_i$ and $\mu$ is an average load of the server resources, the data transfer constraints of the server cluster is defined as a sum of storage demand of the server resources in the server cluster based on one or more tenants migrating from one server resource to another server resource, the sum of storage demand is expressed as:

$\mathcal{D} = \Sigma_j^{|T|} f_j \times D_j$, where $D_j$ is a disk space demanded by a tenant $t_j$, and $f_j$ equals to 1 when $t_j$ is migrated, otherwise $f_j$ equals to zero, and the load balance constraints and the data transfer constraints are normalized and summed in a fitness function with a weighting parameter, the fitness function is expressed as:

Fitness = $\alpha \mathcal{L} + (1-\alpha) \mathcal{D}$, where $\alpha$ is the weighting parameter.

* * * * *